> 3,155,700
> PREPARATION OF ACYL ISOCYANATES
> Paul R. Steyermark, Silver Spring, Md., assignor to W. R. Grace & Co., New York, N.Y., a corporation of Connecticut
> No Drawing. Filed Mar. 5, 1964, Ser. No. 349,758
> 4 Claims. (Cl. 260—453)

The present invention relates to the preparation of acyl isocyanates, and more specifically to a novel and economical method for producing both monofunctional and difunctional acyl isocyanates from inexpensive source materials.

Monofunctional and difunctional acyl isocyanates having the general formulae:

$$R-\overset{O}{\underset{\|}{C}}-N=C=O \quad \text{and} \quad O=C=N-\overset{O}{\underset{\|}{C}}-R-\overset{O}{\underset{\|}{C}}-N=C=O$$

respectively, wherein R is an organic radical, have long been recognized by those skilled in the art as useful intermediates for preparing urea and urethane type compounds.

To date the only practical method by which acyl isocyanates may be prepared involves reacting acyl halides with silver cyanate. Obviously, the use of an expensive reagent such as silver cyanate tends to make the cost of acyl isocyanates too high for their wide scale commercial exploitation. An increased use of these potentially valuable isocyanates might well be expected if a cheaper method for their preparation was developed.

It is therefore an object of the present invention to provide a method for preparing acyl isocyanates by an inexpensive process.

It is another object of the present invention to provide a method by which a variety of both monofunctional and difunctional acyl isocyanates may be prepared from relatively inexpensive source materials.

These and still further objects of the present invention will become readily apparent to one skilled in the art from the following detailed description and specific examples.

Broadly, the present invention contemplates a method for producing acyl isocyanates which comprises reacting an acyl halide with isocyanic acid in the presence of a weak base.

More specifically, the present invention involves reacting mono- or diacyl halides having the formulae:

$$R'-\overset{O}{\underset{\|}{C}}-X \quad \text{and} \quad X-\overset{O}{\underset{\|}{C}}-R''-\overset{O}{\underset{\|}{C}}-X$$

wherein R' is a substituted or unsubstituted alkyl, alkenyl or aryl radical, R" is a substituted or unsubstituted alkylene or arylene radical, and X is halogen, including chlorine and bromine, with isocyanic and (HNCO) in the presence of a weak base having a $pK_b$ of from about 3 to about 10 which serves as a proton acceptor.

The overall reaction which occurs in the present invention may be illustrated by the following equations:

(1) For the case of monofunctional acyl halides $$R'-\overset{O}{\underset{\|}{C}}-X + HNCO + base \longrightarrow R-\overset{O}{\underset{\|}{C}}-N=C=O + base.HX$$

(2) For the case of difunctional acyl halides $$X-\overset{O}{\underset{\|}{C}}-R''-\overset{O}{\underset{\|}{C}}-X + 2HNCO + 2\,base \longrightarrow$$
$$O=C=N-\overset{O}{\underset{\|}{C}}-R''-\overset{O}{\underset{\|}{C}}-N=C=O + 2\,base.HX$$

The reaction is carried out in the liquid phase in the presence of an inert organic solvent such as an ether, or hydrocarbon. Specific examples of suitable solvents are diethyl ether, tetrahydrofuran, xylene, hexane and pentane. In general, the use of an ether as a solvent is preferred due to the fact that isocyanic acid is more soluble therein than in hydrocarbon type solvents.

The reaction occurs exothermically; therefore, in general, no special heating is required to initiate or maintain the reaction. In many cases cooling may be advantageous to avoid excessive solvent loss.

The isocyanic acid used in the present invention may be derived from any convenient source. Typical sources of isocyanic acid are reactions in which cyanuric acid or urea are pyrolyzed.

As will be shown in the specific examples, the pyrolysis products which contain isocyanic acid are conveniently absorbed or dissolved is the solvents which are used in the present process.

The proton acceptors or weakly basic materials which are used to drive the present reaction toward the desired isocyanate formation may be broadly described as those having a $pK_b$ constant of from about 3 to about 10 measured in aqueous solution. Furthermore, the bases used in the present reaction should not contain active hydrogen substituents, or other possible substituents which react with active isocyanate groups.

The preferred class of basic compounds which is used may be defined as tertiary amines which have a $pK_b$ constant of from about 3 to about 10, and which bear no substituents which will react with active isocyanate groups. Thus, the tertiary amines used in the present reaction possess the general formula $$R_1-\underset{\underset{R_3}{|}}{\overset{\overset{R_2}{|}}{N}}-R_3$$

wherein $R_1$, $R_2$ and $R_3$ represent organic substituents which are nonreactive toward isocyanate. Typical examples of radicals from which $R_1$, $R_2$, and $R_3$ may be selected are hydrocarbon radicals such as alkyl and alkenyl having from about 1 to 18 carbon atoms, phenyl, alkyl phenyl wherein the alkyl substituent possess 1 to 12 carbon atoms, cyclo alkyl containing 3 to 6 methylene radicals, and so forth. Furthermore, tertiary amines may be used in which $R_1$, $R_2$ and $R_3$ may combine to form di- and tri-valent heterocycle forming radicals which may or may not contain oxy linkages.

Typical examples of tertiary amines which may be used in accordance with the present invention are set forth in the table below along with their corresponding $pK_b$ constants—

TABLE

| Amine: | $pK_b$ |
|---|---|
| Diethyl benzyl amine | 4.52 |
| Dimethyl benzyl amine | 5.07 |
| Methyl diethyl amine | 3.66 |
| Pyridine | 8.85 |
| Quinoline | 9.20 |
| Tri-isobutyl amine | 3.68 |
| Tri-ethyl amine | 3.25 |
| Tri-methyl amine | 4.28 |
| Tri-propyl amine | 3.30 |
| N,N-dimethylaniline | 8.94 |

Alternatively the basic condition required from the present reaction may be provided by basic ion exchange resins.

Examples of acyl halides which may be utilized in the practice of the present invention are as follows.

(1) Monofunctional acyl halides having the formula:

$$R_1-\overset{O}{\underset{\|}{C}}-X$$

wherein $R_1$ may be alkyl having 1 to 30 continuous carbon atoms alkenyl, nitrophenyl, naphthyl, a heterocyclic radical, or an alicyclic radical; and X is chlorine or bromine.

(2) Difunctional acyl halides which have the general formula:

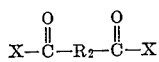

wherein $R_2$ may be alkylene having 3 to 34 continuous carbon atoms, arylene and cycloalkylene; and X is chlorine or bromine. Specific examples of useful acyl halides are acetyl chloride, stearoyl chloride, o-methoxy benzoyl chloride, 2,4-dichlorobenzoyl chloride, palmitoyl-chloride, myristoyl chloride, sebacoyl chloride, azelaoyl chloride, glutaroyl chloride, and pimeloyl chloride.

Having described the basic elements of the present invention the following specific examples are given to illustrate specific embodiments thereof.

*Example I*

Depolymerization of 15 grams of cyanuric acid at 620° C. gave 11 grams of isocyanic acid dissolved in 205 milliliters of anhydrous diethyl ether. To 183 ml. of this solution, (which contain 9.9 grams of isocyanic acid) was added 18.1 grams of acetyl chloride. The solution was cooled to $-10°$ C. in an ice-salt bath, and 18.1 grams of pyridine was added dropwise with stirring. The mixture was stirred for 1 hour at 0° C., and then 2 hours at room temperature. It was then cooled at 0° C. for 15 hours. Pyridine hydrochloride which precipitated during the reaction was removed by filtration and the ether was evaporated at atmospheric pressure. The residue, which weighed 8 grams, was distilled through a 30 centimeter glass column packed with glass rings. A yield of 2.9 (15.2%) of acetyl isocyanate boiling at 80 to 81° C. at 766 Hg pressure was obtained. The isocyanate had the following physical constants:

Index of refraction at 25° C.=1.4029, density at 25° C.=1.0826 (reported density at 18° C.=1.0892).

*Example II*

A solution containing 2.0 grams of isocyanic acid (HNCO) and 11.2 grams of stearoyl chloride dissolved in 200 ml. of tetrahydrofuran (THF) was cooled to $-2°$ C. 2.98 cc. of dry pyridine was added dropwise to the solution with stirring whereupon the temperature rose to $+1°$ C. Then 110 ml. of n-pentane was added, and the resulting pyridine hydrochloride precipitate was removed by filtration. A portion of the solution containing the isocyanate was then reacted with an excess amount of dibutylamine. The excess amine was then titrated with hydrochloric acid to determine the concentration of isocyanate. In this example a yield of 87% stearoyl isocyanate was obtained.

*Example III*

An 8.9 gram quantity of o-methoxybenzoyl chloride was dissolved in 150 ml. of THF. This solution was combined with 3.0 grams of HNCO dissolved in another 36 ml. of THF. The mixture was then cooled to $+5°$ C. and 4.0 ml. of dry pyridine was added. During the pyridine addition the temperature was permitted to rise to 30° C. during which time a heavy precipitate appeared. About 10 ml. of pentane was added to insure complete precipitation of pyridine hydrochloride from the solution. The hydrochloride was removed by filtration. Titration with dibutylamine and HCl indicated that an 87% yield of o-methoxybenzoyl isocynate had been obtained.

*Example IV*

A solution containing 12.5 grams of dichlorobenzoyl chloride and 2.88 grams HNCO (10% excess) in 100 ml. of THF was prepared. To this solution, which had been cooled to $-10°$ C., 4.82 ml. of dry pyridine was slowly added with stirring. 150 ml. of pentane was then added and a precipitate of pyridine hydrochloride was removed by filtration. An aliquot portion of the filtered solution, when titrated with dibutylamine and hydrochloric acid, indicated that a 48% yield of 2,4-dichlorobenzoyl isocyanate was obtained.

*Example V*

4.65 grams of palmitoylchloride and about 0.7 grams of HNCO were dissolved in 100 ml. of THF. The mixture was kept at room temperature (20° C.) while 1.30 ml. of dry pyridine was added with stirring. The mixture was then diluted with ethyl ether, and a precipitate of pyridine hydrochloride was removed by filtration. The yield was about 57% palmitoylchloride dissolved in reaction solvent.

*Example VI*

A solution of 5.1 grams myristoyl chloride and 0.89 grams of HNCO in 150 ml. of THF. was prepared. To this solution 1.67 ml. of pyridine was added with stirring. The reaction was carried out at room temperature. About 10 ml. of the solvent was removed by evaporation at room temperature, at which time a copious precipitate of pyridine HCl had formed. This precipitate was removed by filtration. It was found that a yield of about 68% myristoyl isocyanate had been obtained.

*Example VII*

A solution containing 10.3 grams of HNCO and 18.7 of adipoyl chloride in THF was prepared. 16.9 ml. of pyridine was added with stirring while the reaction temperature was maintained at $-5$ to $-10°$ C. The solution was filtered to remove pyridine hydrochloride, and the solution was evaporated under vacuum to dryness. Analysis of the pyridine hydrochloride for chloride ion indicated that an 80% conversion of adipoyl chloride to adipoyl isocyanate had taken place.

*Example VIII*

To a solution containing 7.0 grams of HNCO in 240 ml. of THF, 16.5 grams of sebacoyl chloride was added. The solution was cooled to $-8°$ C. and 11.2 grams of pyridine was added with stirring during which time the temperature rose to $-1°$ C. A precipitate of pyridine hydrochloride was removed by filtration, and the solution was concentrated to 50 ml. under vacuum. Analysis of this material indicated a 90% yield of sebacoyl isocyanate had been obtained.

*Example IX*

A solution containing 4.06 grams of HNCO and 10.0 grams of azelaoyl chloride in 110 ml. of THF was prepared and cooled to $-11°$ C. 7.23 ml. of pyridine was added with stirring during which time the temperature was allowed to rise to 20° C. The solution was filtered and the filtrate was concentrated to 60–70 ml. A yield of 92% azelaoyl isocyanate was indicated.

*Example X*

7.5 grams of glutaroyl chloride and 4.2 grams of HNCO in ethyl ether were cooled to 10° C. 7.15 ml. of pyridine were added with stirring while the temperature rose to 20° C. The solution was filtered to remove pyridine hydrochloride precipitate and concentrated under vacuum. Analysis of the residue indicated a 40% yield of glutaroyl isocyanate.

*Example XI*

A solution containing 4.8 grams of pimeloyl chloride and 2.8 grams of HNCO in 40 ml. of ethyl ether was prepared. The solution was cooled to 10° C. and 3.93 ml. of pyridine was added. During the pyridine addition the temperature rose to 20° C. and a gummy precipitate formed. The solution was filtered, and the filtrate was concentrated under vacuum. Analysis indicated that a 49% yield of pimeloyl isocyanate had been obtained.

*Example XII*

13.4 grams of methacryloyl chloride and 6 grams of HNCO was dissolved in 200 ml. of hexane. This solution was cooled to −10° C. and 10.0 ml. of pyridine was added. The mixture was allowed to come to room temperature while a precipitate of pyridine hydrochloride formed. The precipitate was removed by filtration and the solvent removed by evaporation. The residue weighing 5.8 grams was then distilled, and a fraction boiling at 106° C. was collected. The resultant methacrylolyl isocyanate weighed 1.6 grams.

*Example XIII*

A solution containing 5 grams of sebacoyl chloride and 2.72 grams of isocyanic acid in 140 ml. of THF was prepared. 4.2 grams of triethylamine was slowly added with stirring, during which time the temperature of the reaction mixture rose from −9.5° to +3.0° C. A precipitate of triethylamine hydrochloride was removed by filtration. Titration of the precipitate for chloride indicated that 82% of the sebacoyl chloride had been converted during the reaction. Direct titration for isocyanate indicated that a 19% yield of sebacoyl isocyanate had been obtained.

*Example XIV*

5 grams of sebacoyl chloride and 2.7 grams of isocyanic acid was dissolved in 140 ml. of THF. 4.2 grams of N-methylmorpholine was added with stirring while the initial reaction temperature of 6° C. rose to 10° C. Titration for chloride indicated an 80% conversion of sebacoyl chloride. The yield of sebacoyl isocyanate was 42%.

*Example XV*

A solution containing 2 grams of sebacoyl chloride and 1.42 grams of isocyanic acid in 75 ml. of toluene was prepared. 1.32 grams of pyridine was added with stirring. The temperature rose from 20° to 34° C. Analysis indicated an 86% conversion of sebacoyl chloride, and 13.6% yield of sebacoyl isocyanate.

*Example XVI*

2 grams of sebacoyl chloride and 1.12 grams of isocyanic acid were dissolved in 75 ml. of nitroethane. 1.33 grams of pyridine was added, and the temperature of the reaction mixture rose from 3° to 10° C. The solution was diluted with 175 ml. of ether and allowed to stand for 72 hours at 18° C. whereupon a solid precipitate formed. The solution of sebacoyl isocyanate was decanted, and the precipitate was dissolved in water and titrated for chloride. The chloride titration indicated a 50% conversion of sebacoyl chloride had taken place.

*Example XVII*

A solution was prepared which contained 2 grams of sebacoyl chloride and 1.16 grams of isocyanic acid in acetonitrile. 1.33 grams of pyridine was slowly added while the temperature rose from an initial 10° C. to a final 15° C. The solution was diluted with 150 ml. of ethyl ether whereupon a solid precipitate of pyridine hydrochloride formed upon standing. The solution was decanted from the solid precipitate and the precipitate was dissolved in water. Titration of the hydrochloride indicated that 73.6% of the sebacoyl chloride had been utilized in the reaction.

*Example XVIII*

8.7 grams of methacrylic chloride and 4.03 grams of isocyanic acid were dissolved in 250 ml. of ether. 6.55 grams of pyridine was added, and the temperature rose from 0° to 5° C. Pyridine hydrochloride was removed by filtration. Analysis indicated that 78% of the methacrylic chloride had been converted. Yield of methacrylic isocyanate was found to be 72%.

*Example XIX*

A solution of 6.5 grams of methacrylic chloride and 3.51 grams of isocyanic acid was dissolved in 275 ml. of ethyl ether. The reaction mixture was maintained at 5° C. while 4.9 grams of pyridine was added with stirring. Titration of the pyridine hydrochloride which precipitated during the reaction indicated that an 82% conversion of methacrylic chloride has occurred. The yield of methacrylic isocyanate was 66%.

*Example XX*

To a solution of 8.6 g. (0.2 mole) of isocyanic acid in 200 ml. of anhydrous ether, there was added 24.6 g. (0.2 mole) of acetyl bromide. The solution was cooled to −10° C. in an ice-salt bath, and 15.8 g. (0.2 mole) of pyridine was added dropwise with stirring. The mixture was allowed to warm to room temperature, where it was maintained for two hours. Finally, the mixture was cooled for 15 hours at 0° C. Pyridine hydrobromide, which had formed in the reaction, was filtered. The filtrate was concentrated to remove ether, and the residue was fractionated at normal pressure through a column packed with glass rings. Acetyl isocyanate was collected as a fraction boiling at 80–81° C. at 766 mm. of Hg. The yield was 3.0 g. (15.8%).

The above specific examples clearly illustrate that acyl isocyanates may be conveniently and economically prepared from acyl halides and isocyanic acid.

The acyl isocyanates prepared in accordance with the present invention react readily with alcohols and amines to form urethanes and ureas respectively.

The present application is a continuation-in-part of my earlier filed application 152,644, filed November 15, 1961, now abandoned.

I claim:

1. A method for preparing acyl isocyanate selected from the group consisting of

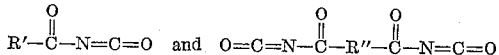

wherein R′ is selected from the group consisting of alkyl, alkenyl phenyl, halophenyl, lower alkyl phenyl, lower alkoxy phenyl, nitrophenyl and naphthyl and R″ is selected from the group consisting of alkylene, phenylene, and cycloalkylene which comprises reacting an acyl halide selected from the group consisting of

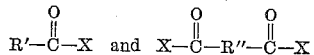

wherein R′ and R″ have the meanings given previously, and X is selected from the group consisting of chlorine and bromine, with isocyanic acid in the presence of a tertiary amine having a pK$_b$ constant of from about 3 to 10.

2. The method of claim 1 wherein the reaction is conducted in the presence of an inert solvent.

3. The method of claim 2 wherein the tertiary amine is pyridine.

4. The method of claim 2 wherein the tertiary amine is triethylamine.

No references cited.